US009752804B2

(12) United States Patent
Sommer et al.

(10) Patent No.: US 9,752,804 B2
(45) Date of Patent: Sep. 5, 2017

(54) METHOD FOR OPERATING A CYCLICAL THERMAL ADSORPTION HEATING OR REFRIGERATION SYSTEM, AND DEVICE

(75) Inventors: Sebastian Sommer, Halle (DE); Ingo Dassler, Halle (DE)

(73) Assignee: SORTECH AG, Halle (Saale) (DE)

( * ) Notice: Subject to any disclaimer, the term of this patent is extended or adjusted under 35 U.S.C. 154(b) by 890 days.

(21) Appl. No.: 14/115,992

(22) PCT Filed: May 16, 2012

(86) PCT No.: PCT/EP2012/059198
§ 371 (c)(1),
(2), (4) Date: Jun. 4, 2014

(87) PCT Pub. No.: WO2012/156481
PCT Pub. Date: Nov. 22, 2012

(65) Prior Publication Data
US 2014/0298832 A1    Oct. 9, 2014

(30) Foreign Application Priority Data

May 19, 2011  (DE) .................. 10 2011 102 036

(51) Int. Cl.
*F25B 15/00*   (2006.01)
*F25B 17/00*   (2006.01)
*F25B 17/08*   (2006.01)

(52) U.S. Cl.
CPC .............. *F25B 17/00* (2013.01); *F25B 17/08* (2013.01); *F25B 2400/24* (2013.01); *Y02B 30/62* (2013.01); *Y02B 30/64* (2013.01)

(58) Field of Classification Search
CPC ..... F25B 17/00; F25B 17/083; F25B 2400/24
See application file for complete search history.

(56) References Cited

U.S. PATENT DOCUMENTS 8,539,782 B2    9/2013  Buttner et al. .................. 62/112
2009/0282846 A1  11/2009  Munz et al. ..................... 62/106
(Continued)

FOREIGN PATENT DOCUMENTS

DE          19908666       9/2000  ............. F25B 30/04
DE         102006011409    6/2007  ............. F25B 17/00
(Continued)

OTHER PUBLICATIONS

Notification Concerning Transmittal of International Preliminary Report on Patentability (Chapter I of the Patent Cooperation Treaty), in English, dated Nov. 28, 2013, International Preliminary Report on Patentability (Chapter I of the Patent Cooperation Treaty), in English, dated Nov. 19, 2013, Written Opinion of the International Searching Authority, in English (Nov. 19, 2013—mailed with Notification Concerning Transmittal of the International Preliminary Report on Patentability), and International Search Report, in English, dated May 2, 2013, each of which was issued by the International Bureau of WIPO for corresponding PCT Application No. PCT/EP2012/059198, filed on May 16, 2012.

*Primary Examiner* — Allen Flanigan
*Assistant Examiner* — Filip Zec
(74) *Attorney, Agent, or Firm* — Bodner & O'Rourke, LLP; Gerald T. Bodner; Christian P. Bodner (57) ABSTRACT

The invention relates to a method and a device for operating a cyclical thermal adsorption heating or refrigeration system having a desorption phase and an adsorption phase, comprising at least one adsorber/desorber unit (A/D), a refrigerant cyclically adsorbed during the adsorption phase and desorbed during the desorption phase, and an evaporator/condenser unit (V/K) that acts as an evaporator (V) or as a condenser (K) depending on the process phase. The method and the device intended for carrying out the method are characterized by a cyclic heat recovery that occurs at the same time in a heat recovery circuit having a temporary store (ZS) and a heat transfer medium, comprising the following (Continued)

steps. At the end of the desorption phase, the heat transfer medium having a low temperature is brought from the temporary store into thermal contact with the evaporator/condenser unit, and at the same time the hot heat transfer medium is transferred from the evaporator/condenser unit into the temporary store in a first temporary storage phase. At the end of the adsorption phase, the heat transfer medium having the higher temperature is brought from the temporary store into thermal contact with the evaporator/condenser unit. At the same time, the cold heat transfer medium is transferred from the evaporator/condenser unit into the temporary store in a second temporary storage phase.

6 Claims, 8 Drawing Sheets

(56) References Cited

U.S. PATENT DOCUMENTS

| 2010/0192602 | A1* | 8/2010 | Brooks | B60H 1/005 62/101 |
|---|---|---|---|---|
| 2011/0167842 | A1 | 7/2011 | Paulussen | 62/79 |
| 2013/0220576 | A1 | 8/2013 | Paulussen | 165/65 |

FOREIGN PATENT DOCUMENTS

| DE | 102006043715 | 3/2008 | F25B 30/04 |
|---|---|---|---|
| DE | 102007061551 | 7/2009 | F25B 17/08 |

* cited by examiner

METHOD FOR OPERATING A CYCLICAL THERMAL ADSORPTION HEATING OR REFRIGERATION SYSTEM, AND DEVICE

The invention relates to a method for operating a cyclically working thermal adsorption heat or refrigeration system according to claim 1, and to a device for an adsorption heat or refrigeration system according to the patent claims.

Most simply constructed cyclically working adsorption heat or refrigeration systems comprise an adsorber unit in which a refrigerant is cyclically adsorbed and desorbed, and an evaporator/condenser unit in which the refrigerant is either condensed or evaporated depending on the currently performed sub-step. In many cases adsorption heat or refrigeration systems are employed which comprise two push-pull-operated adsorber units and at least one condenser and one evaporator. Depending on the intended use pursued with such a system adsorption heat or refrigeration systems may be used either as a heat pump in the actual sense, i.e. for heating, or also as a refrigerating machine, i.e. for cooling.

In such systems a thermodynamic process is performed. The adsorber device contains a sorbent which adsorbs and desorbes the refrigerant. The refrigerant which is transferred into the vapor phase in the evaporator or the evaporator/condenser unit extracts heat from the ambiance and is coupled to the sorbent in the adsorber device. Subsequently, the adsorbed refrigerant is desorbed. To this end, energy, in particular thermal energy, is supplied externally to the adsorber device. The refrigerant is now desorbed from the sorbent and passed on to, respectively returned to a condenser or to the evaporator/condenser unit which is now acting as a condenser. Upon the completion of this desorption process the adsorber device is cooled again and is available for a new adsorption. At the same time, the liquified refrigerant flows from the condenser into the evaporator, or remains in the evaporator/condenser unit, and is transferred again into the gaseous state. The working cycle of the adsorption heat or refrigeration system is now closed.

In the simplest case the adsorption heat or refrigeration system is formed of one single adsorber unit in which a cyclic adsorption and desorption takes place, with the refrigerant being alternately condensed and evaporated on a heat exchanger, and of the evaporator/condenser unit which alternately absorbs heat from the ambiance and dissipates heat to the ambiance and in which the refrigerant is both condensed and evaporated.

In the technically operated adsorption and desorption processes the recovery of the heat exchanged in these processes constitutes an essential aspect which has a great impact on the efficiency of the adsorption heat or refrigeration system. A considerable portion of the supplied heat is required for heating the technical components which are not participating as such in the heat pumping process. Same constitute an unavoidable thermal mass with a corresponding inertia.

Another important aspect significant for the efficiency of the adsorption heat or refrigeration system relates to the so-called loading width of the sorbent in the adsorber unit(s). The loading width indicates which portion of the sorbent or, respectively, which portion of the adsorber surface predefined in the adsorber unit is actually available for the sorption processes. The loading width is in particular restricted if certain residual constituents of the refrigerant remain in the adsorbed state. The sorption surface occupied by this residual portion is no longer available for adsorption and desorption processes and equally constitutes an inert thermal mass of the adsorption heat or refrigeration system.

From the prior art according to DE 10 2006 011 409 B4 a method is known by means of which the heat recovery is accomplished. In the heat recovery process two adsorber units are used which are push-pull-operated. A first adsorber unit is used in the adsorption phase and a second adsorber unit is used in the desorption phase of the working cycle. The heat stored in the desorption phase is transferred by means of a heat transfer medium from the corresponding adsorber unit used for the preheating into the second adsorber unit in the adsorption phase. Both adsorber units are thus coupled to each other by a closed or open heat transfer circuit. Hence, with this type of heat recovery the heat is exchanged directly between both adsorber units.

Increasing the loading width, and thus optimizing the ratio between the thermal masses of the refrigerant on the one hand, and those of the apparatus on the other hand, is realized according to the prior art by additionally reducing the desorption pressure inside the respective adsorber unit during the desorption phase. In adsorption heat or refrigeration systems operated with two push-pull-operated adsorber units, the adsorber units located in the adsorption phase and in the desorption phase are, to this end, short-circuited for a short time. By this, the desorption in one unit effects an increase of the adsorption pressure in the other unit. The refrigerant is virtually driven from one unit to the other unit. Thus, both the desorption and the adsorption are forced and, as a result, the so-called loading width of the sorbent is increased. Thus, at least a more effective desorption and adsorption can take place. As a consequence, more refrigerant is thus recovered for the process cycle.

Both methods, viz. operating a heat transfer circuit between the adsorber units and short-circuiting the units are relatively complicated from the technical viewpoint. Each of them requires precisely timed valve controls and the measurements of different process parameters, e.g. pressure and temperature, as well as control circuits for adjusting and maintaining an optimum operating point. Both methods are, therefore, realized only rarely at the same time as the joint realization now also requires a mutual adjustment of the heat transfer circuit to the short-circuiting switch for the adsorber units.

It is, therefore, the object to provide an efficient method for operating a cyclically working adsorption heat or refrigeration system, by means of which an efficiency increase, in particular an effective recovery of the refrigerant for the process cycle can be achieved in an easy manner. In addition, the heat recovery is to be intensified in connection with an increase of the loading width.

The object is achieved by a method for operating a cyclically working adsorption heat or refrigeration system of the above-mentioned generic type which, according to the invention, comprises the characterizing features of claim 1. With regard to the device the object is achieved with the characterizing features of claim 9. The dependent claims describe useful and/or advantageous embodiments of the method or the device.

The method for operating a cyclically working thermal adsorption heat or refrigeration system including a desorption phase and an adsorption phase, comprising at least one adsorber/desorber unit, a refrigerant cyclically adsorbed during the adsorption phase and desorbed during the desorption phase, and an evaporator/condenser unit acting as an evaporator or as a condenser depending on the process phase is characterized, according to the invention, in that by a cyclic heat recovery taking place at the same time in a heat recovery circuit having a temporary storage and a heat transfer medium the following method steps are carried out:

During the desorption phase the heat transfer medium having a low temperature is brought into thermal contact with the evaporator/condenser unit. The heat transfer medium is heated during the thermal contact, and the heated heat transfer medium is displaced into the temporary storage at the end of the cycle in a first temporary storage phase.

During the adsorption phase the heat transfer medium is brought into thermal contact with the evaporator/condenser unit. The heat transfer medium is cooled to the low temperature during the thermal contact, and the cooled heat transfer medium is displaced into the temporary storage at the end of the cycle in a second temporary storage phase.

It is, thus, the basic idea of the method according to the invention to heat up the evaporator/condenser unit additionally during the adsorption phase by the supply of thermal energy which was extracted at the evaporator/condenser unit during the desorption phase. Thus, two aims are achieved at the same time. Firstly, a certain amount of heat is retained in the thermodynamic process and utilized for carrying out the respective other phase of the process. Secondly, by the dissipation of the amount of heat on the one hand, and by the supply of this amount of heat on the other hand, the desorption pressure, respectively adsorption pressure in the system are reduced, respectively increased. The refrigerant circulating between the adsorber unit and the evaporator/condenser unit is condensed faster and, thus, desorbed from the adsorber unit, respectively evaporated faster and driven back into the adsorber unit.

The so described steps can be carried out particularly well in adsorption heat or refrigeration systems where only one adsorber unit, which serves both in the desorption and adsorption, is coupled to an evaporator/condenser unit, which serves both in the condensation and the evaporation of the refrigerant. In such a case, the condensation heat released in the evaporator/condenser unit in the desorption phase is absorbed by the heat transfer medium and stored in the temporary storage. Subsequently, in the following adsorption phase, the now heated heat transfer medium is returned to the evaporator/condenser unit and is now brought back into thermal contact again. The evaporation now taking place in the evaporator/condenser unit is supported by this temporarily stored heat.

In a useful embodiment this cyclic heat recovery is coupled to a process which results in increasing the loading width of the adsorber/desorber unit. This process effects a thermal reduction of the desorption pressure and/or an increase of the adsorption pressure, and comprises the following method steps:

To influence the desorption pressure the evaporator/condenser unit is brought into a low-temperature contact below the condensation temperature during the first temporary storage phase.

Additionally, or in an independent method step, the evaporator/condenser unit is brought into a medium-temperature contact above the evaporation temperature during the second temporary storage phase so as to influence the adsorption pressure.

It is the basic idea of these method steps to support the condensation and/or the evaporation of the refrigerant during the desorption and/or during the adsorption by cooling or heating the evaporator/condenser unit additionally. This requires the setting of defined temperatures for the heat transfer medium to which the corresponding components are exposed. This is realized by coupling the evaporator/condenser unit through the heat transfer medium thermally to a low-, respectively medium-temperature contact with defined temperatures.

Advantageously, the heat transfer medium heated to the high temperature and/or cooled to the low temperature is stored. Thus, the heat recovery and the process of broadening the loading width are combined.

In a useful embodiment of the method the thermal coupling of the evaporator/condenser unit to the low-temperature contact and/or the thermal coupling of the evaporator/condenser unit to the medium-temperature contact are each realized immediately before the start of the first or second temporary storage phase. This means that the mentioned components are brought into the corresponding temperature contacts precisely when the heat transfer medium having the respectively necessary temperature is approached from the temporary storage to the components and flows back at the respectively other temperature to reenter the temporary storage. Thus, the heat transfer medium has a defined temperature that varies upon the contact with the evaporator/condenser unit.

Advantageously, the cyclic heat recovery and the process for increasing the loading width are realized in a valve-controlled manner. The switching times for the valve control are determined depending on a first process temperature measured at the outlet of the evaporator/condenser unit, a second process temperature measured at the outlet of the temporary storage and/or a temperature difference determined between the first and the second process temperatures. Both combined processes are, therefore, performed fully automatically and are adapted in terms of their timing to the actually available temperatures in the system.

In one embodiment of the method the heat of the desorber/adsorber unit is cyclically stored in such a way that the heat transfer medium is temporarily stored on a high-temperature level at the end of the desorption phase and/or on a medium-temperature level at the end of the adsorption phase in a storage designed as a second, additional storage, or also as an exclusive storage, and is resupplied in the subsequent cycle.

Advantageously, a high-temperature contact is used when storing the heat transfer medium on the high-temperature level, wherein the heat transfer medium is recirculated on the temperature level of the high-temperature contact.

With regard to the device a cyclically working thermal adsorption heat or refrigeration system is provided which, for performing a desorption phase and an adsorption phase, is formed with at least one adsorber/desorber unit, a refrigerant cyclically adsorbed during the adsorption phase and desorbed during the desorption phase, and an evaporator/condenser unit alternately operable as an evaporator or a condenser.

According to the invention this device is characterized in that an arrangement for the temporary heat storage thermally coupled to the evaporator/condenser unit is provided. Same consists of a temporary storage, conduits running between the temporary storage and the evaporator, the condenser or the evaporator/condenser unit, and at least one valve device switched by an external control unit, with a heat transfer medium circulating between the above-mentioned components.

Advantageously, the arrangement for the temporary heat storage can be cyclically coupled by the valve device to a medium-temperature contact and/or a low-temperature contact.

Advantageously, at least the following switching positions can be realized by the valve device, which ensure a defined temperature of the heat transfer medium. The following can be realized.

a desorption phase switching position including a locking of the temporary storage and a thermal coupling of the evaporator/condenser units to the medium-temperature contact, a first heat recovery switching position with a circuit formed between the evaporator/condenser unit and the temporary storage, an adsorption phase switching position including a locking of the temporary storage and a thermal coupling of the evaporator/condenser units to the low-temperature contact (NT), a second heat recovery switching position with a circuit formed between the evaporator/condenser unit (V/K) and the temporary storage (ZS).

The heat transfer medium is advantageously a liquid, preferably an aqueous liquid. By this, a high heat capacity and, thus, a high heat storage capacity are obtained.

The medium-temperature contact and/or the low-temperature contact are advantageously formed as external, thermally coupled reservoirs which are in a heat exchange with the heat transfer medium and each have constant temperatures.

In one embodiment of the device at least one temporary storage is provided for cyclically storing the heat of the desorber/adsorber unit on a high-temperature level at the end of the desorption phase and/or on a medium-temperature level at the end of the adsorption phase.

In one embodiment of the device the at least one additional temporary storage is in thermal contact with a high-temperature contact when the heat transfer medium is stored on the high-temperature level, wherein the heat transfer medium is on the temperature level of the high-temperature contact.

In one embodiment the temporary storages ZS may be adapted with respect to their storage volume such that in addition to the water content amount of the heat exchangers of the evaporator/condenser unit V/K, respectively adsorber/desorber unit A/D those water amounts are stored which are required for cooling, respectively heating the heat exchangers. Thus, it is possible to increase the storable amount of heat.

In one embodiment it is possible that in the heat recovery phases the flow of the heat transfer medium through the storages for the extraction/loading of heat is reversed corresponding to the temperature stratification appearing in the storages. By this, the adsorber/desorber unit A/D, respectively the evaporator/condenser unit V/K are preheated/cooled down, and the portion of the heat to be recovered increases significantly.

In one embodiment the adsorption heat or refrigeration system is designed as a quasi continuously working, double-acting adsorption heat or refrigeration system having two adsorber/desorber units which are each operated in the push-pull mode and are alternately switched to the evaporator/condenser unit. However, the adsorption heat or refrigeration system may also be designed as a discontinuously working adsorption heat or refrigeration system.

In one embodiment the adsorption heat or refrigeration system is designed as a quasi continuously working unit which is operated separately as an evaporator and separately as a condenser.

The method and the device used therefor will be explained in more detail below by means of an exemplary embodiment. The accompanying FIGS. 1 to 8 serve illustration purposes. Like reference numbers will be used for like or identically acting components.

Figure 1:
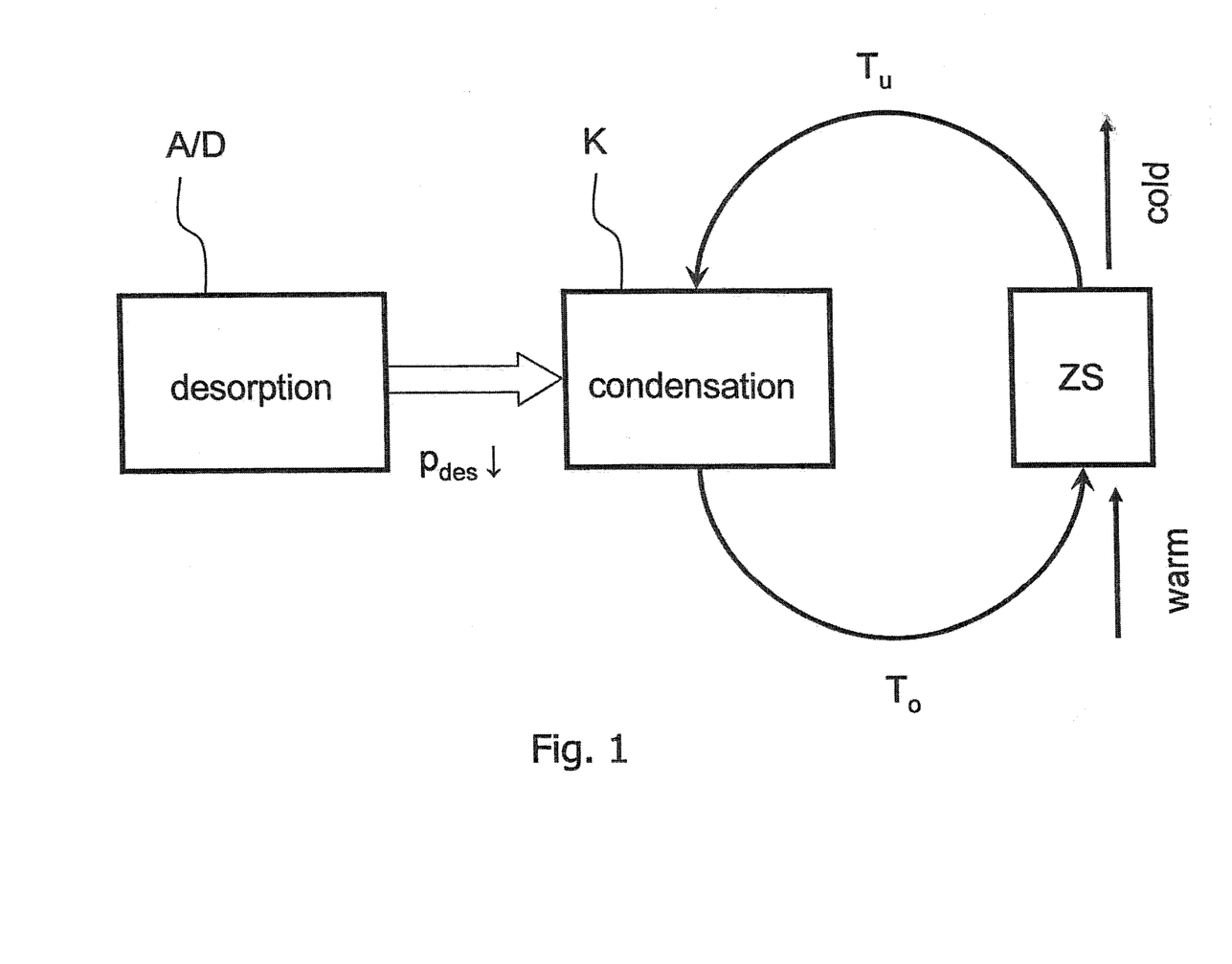
FIG. 1 shows an illustration of the basic process of the heat recovery during the desorption phase.

FIG. 1 shows an illustration of the basic course of the method of the heat recovery in the adsorption heat or refrigeration system during the desorption phase. The adsorption heat or refrigeration system is formed of an adsorber/desorber unit A/D in which both the adsorption and the desorption of a refrigerant take place. The adsorber/desorber unit A/D is coupled to a condenser unit K in which the refrigerant is condensed depending on the respective operating phase of the adsorption heat or refrigeration system.

The heat recovery is performed in a heat recovery circuit. This circuit comprises a temporary storage ZS and is thermally coupled to the condenser unit K. A heat transfer medium, e.g. water, circulates in the heat recovery circuit. The movement of the heat transfer medium is illustrated in FIG. 1 by black arrows. The movement of the refrigerant in the actual adsorption heat or refrigeration system is shown by a white block arrow.

During the desorption of the refrigerant in the adsorber/desorber unit A/D the refrigerant flows into the condenser unit K where it is condensed. The heat transfer medium approached from the temporary storage ZS through the heat recovery circuit is cold and has a temperature $T_u$. The heat transfer medium absorbs the emitted condensation heat through the thermal contact with the condenser unit. The heat transfer medium thus heated to temperature $T_o$ flows back into the temporary storage ZS and displaces the residual cold heat transfer medium. The heat dissipated by the condensation process is now stored in the temporary storage in the form of the warm heat transfer medium.

At the same time, while the condenser unit K is contacted with the cold heat transfer medium the desorption phase in the adsorber/desorber unit A/D is continued and the refrigerant is withdrawn from the gaseous phase as completely as possible. By this, the desorption pressure $p_{des}$ inside the adsorber/desorber unit A/D is reduced so that the desorption takes place more completely and effectively.

Figure 2:
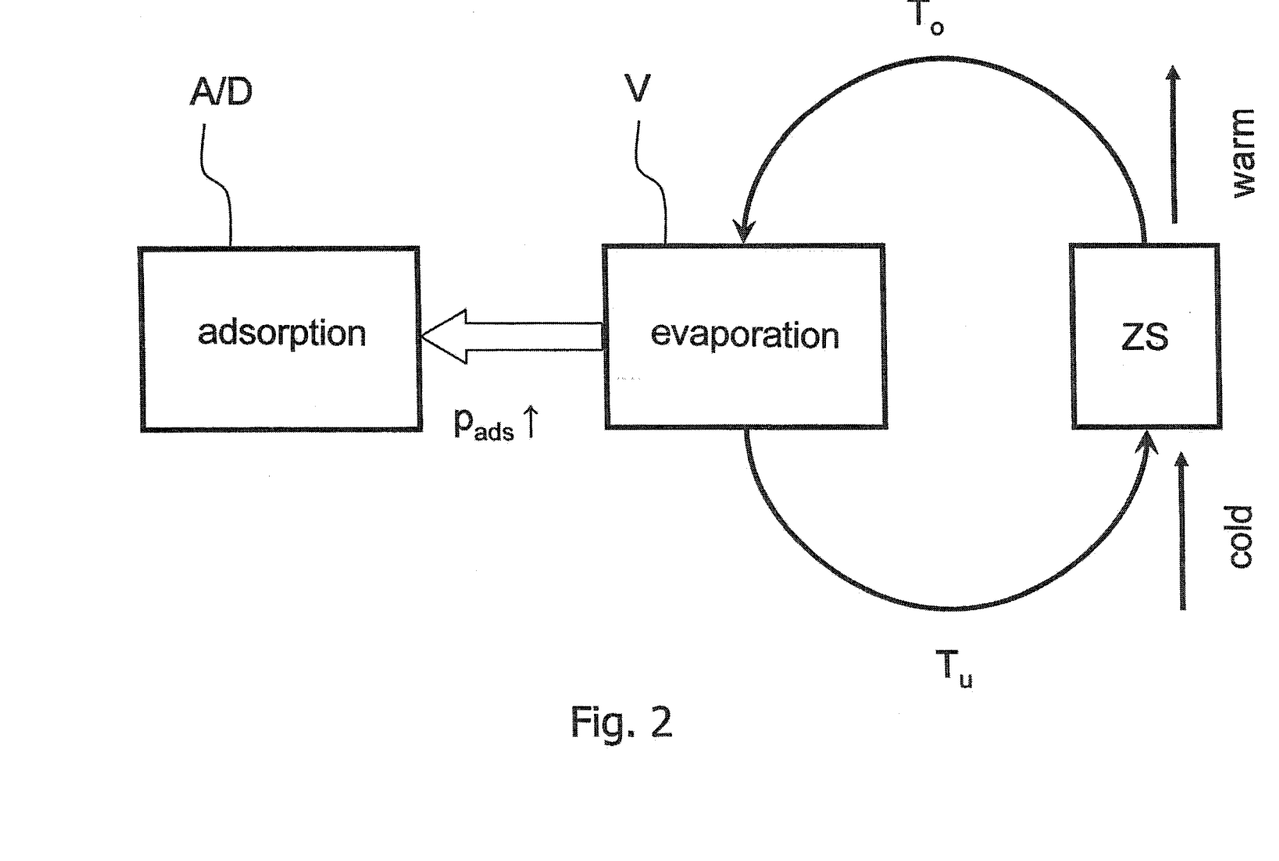
FIG. 2 shows an illustration of the basic process of the heat recovery during the adsorption phase.

FIG. 2 shows an illustration of the basic course of the method of the heat recovery in the adsorption heat or refrigeration system during the adsorption phase. The adsorber/desorber unit A/D is now coupled to an evaporator V. During this phase the refrigerant is evaporated in the evaporator V and adsorbed again in the adsorber/desorber unit A/D. The heated heat transfer medium contained in the temporary storage and having the temperature $T_o$ is now approached through the heat recovery circuit to the evaporator V. The heat transfer medium dissipates the stored heat via the thermal contact to the evaporating refrigerant. At the same time, the temperature of the heat transfer medium drops again to temperature $T_u$. The heat transfer medium, which is now cold, is passed back into the temporary storage ZS and displaces there the residual hot heat transfer medium.

Thus, after the performance of the process shown in FIG. 2 the heat generated at the condenser during the desorption phase and stored temporarily is transferred back to the evaporator during the evaporation phase and, thus, to the adsorption heat or refrigeration system, and is, therefore, recovered for the cyclic process taking place there.

At the same time, the adsorption is continued inside the adsorber/desorber unit. The forced evaporation of the refrigerant in the evaporator increases the adsorption pressure $p_{ads}$ in the adsorber/desorber unit A/D. Thus, the adsorption is performed more effectively.

Thus, it is apparent from the basic illustrations shown in FIGS. 1 and 2 that the heat recovery comes along with an impact on the loading width of the sorption surface in the adsorber/desorber unit A/D, which is realized by the described influencing of the desorption and adsorption pressure.

At the same time it is recognizable from the illustrations shown in FIGS. 1 and 2 that the method for recovering heat and influencing the adsorption and desorption pressure can also be carried out in adsorption heat or refrigeration systems in which the condenser and the evaporator are physically separated from each other.

Figure 4:
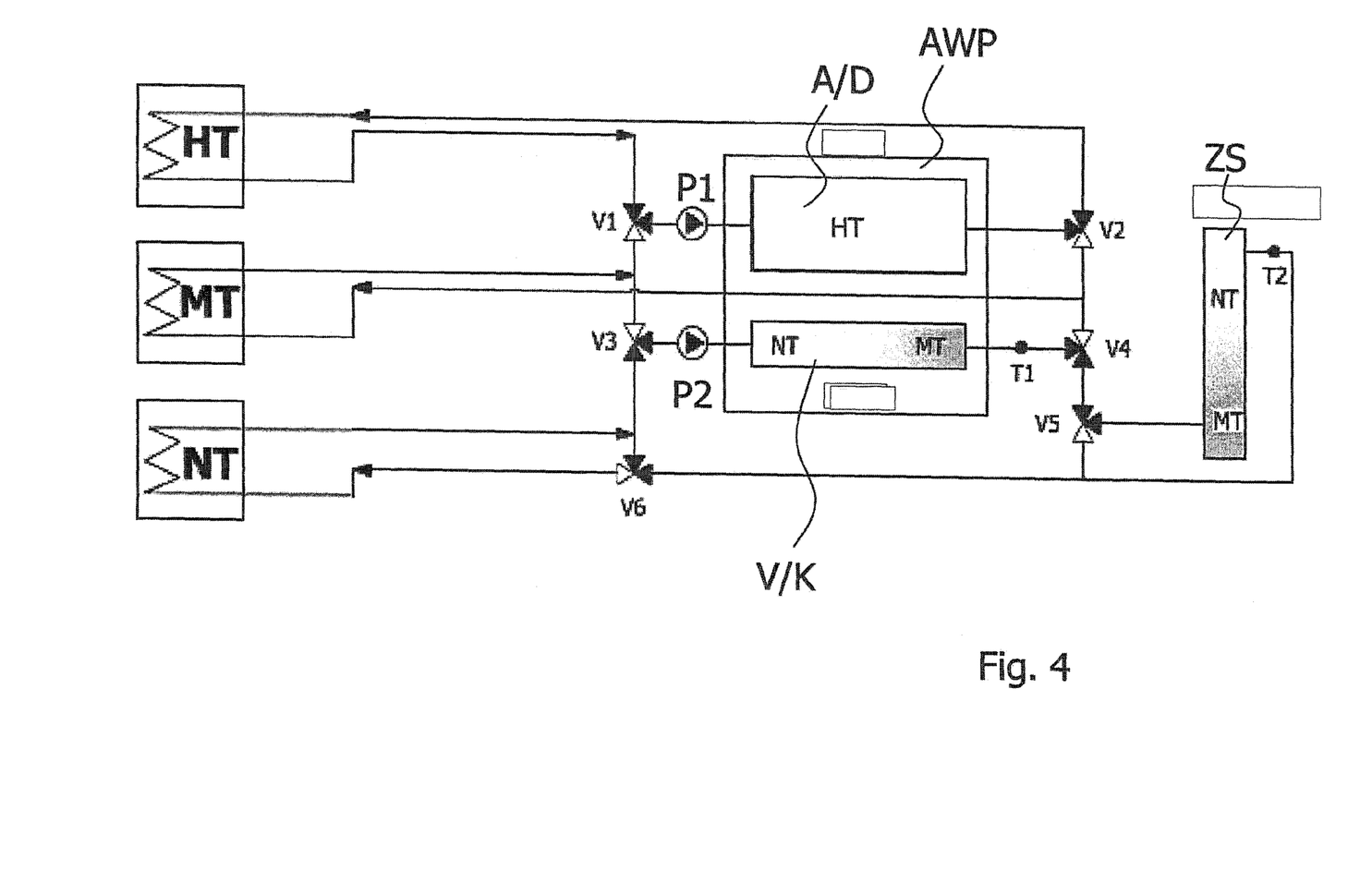
FIG. 4 shows an illustration of the arrangement shown in FIG. 3 whilst undergoing a desorption pressure reduction and a temporary heat storage combined therewith.
Figure 5:
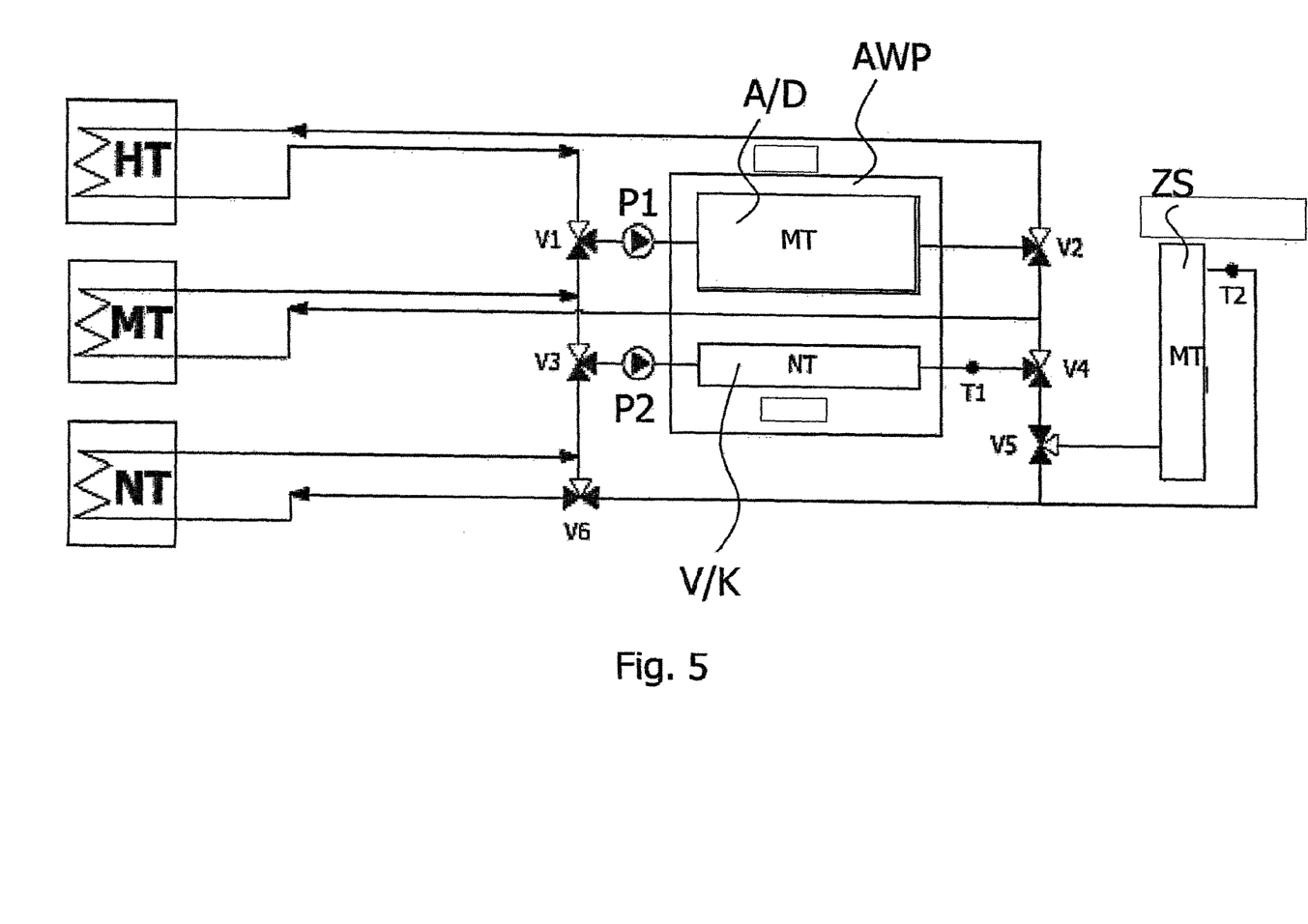
FIG. 5 shows an illustration of the arrangement shown in the previous figures whilst undergoing the adsorption phase.

To obtain a particularly efficient realization of the combination of heat recovery and influencing the desorption, respectively adsorption pressure it is advantageous to bring or maintain the heat transfer medium to/at defined temperatures at least shortly before the individual phases of the heat recovery process and the temporary storage, i.e. at least in a certain period during the operating phases of the adsorption heat or refrigeration system. This is accomplished in the switching positions described below, in which both the components of the adsorption heat or refrigeration system and the heat transfer medium as well as the components of the heat recovery circuit are cyclically brought into a high-temperature contact HT, a medium-temperature contact MT and a low-temperature contact NT. At that, valve devices realize in a cyclic succession a desorption phase switching position Des as shown in FIG. 3, a first heat recovery switching position WR1 as shown in FIG. 4, an adsorption phase switching position Ads as shown in FIG. 5 and a second heat recovery switching position WR2 as disclosed in FIG. 6.

Figure 3:
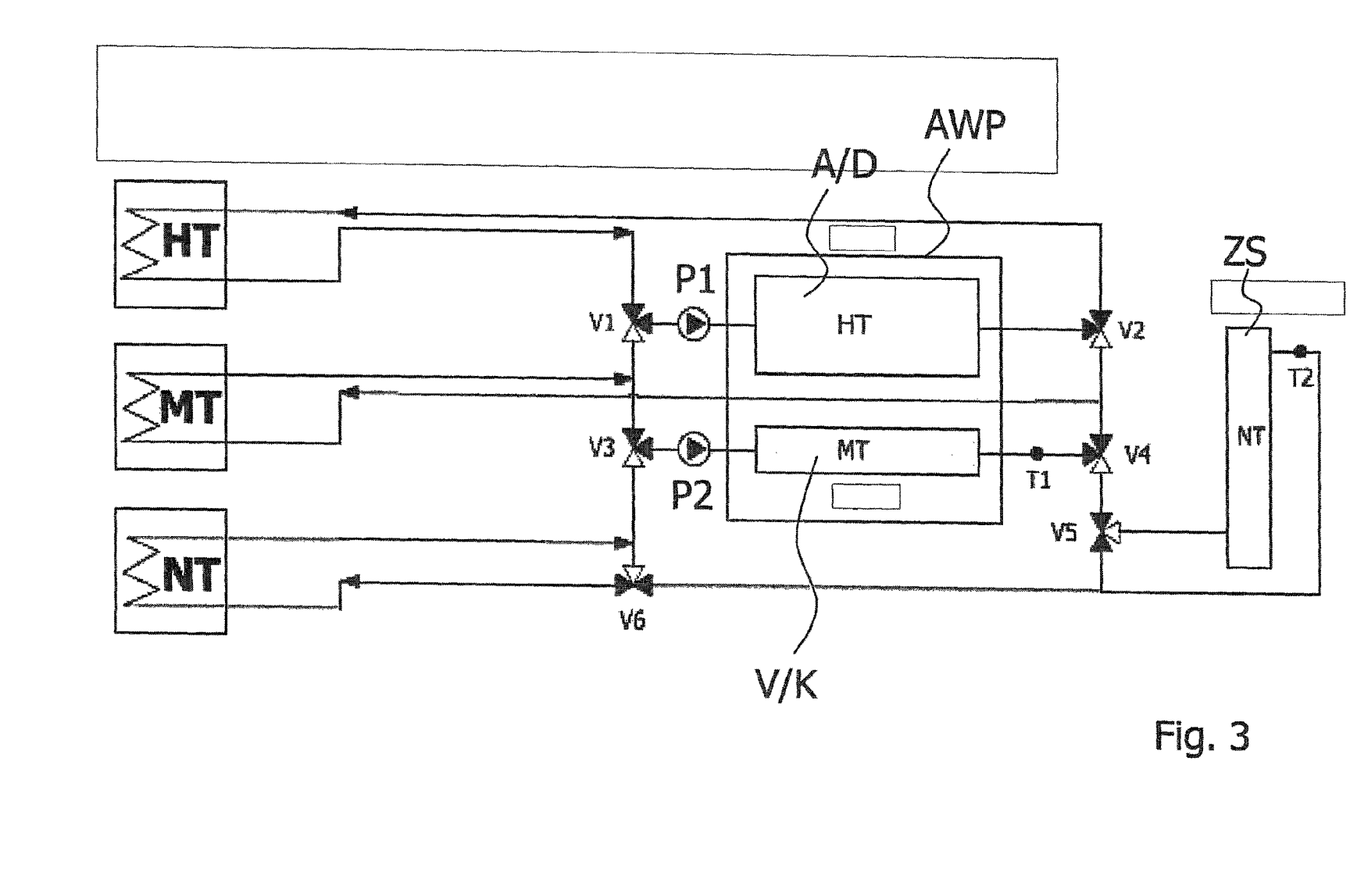
FIG. 3 shows an illustration of an adsorption heat or refrigeration system including an adsorber unit and an evaporator/condenser unit and means provided therefor for influencing the sorption pressure during a desorption phase.

FIG. 3 shows an exemplary hydraulic circuit diagram. The figure simultaneously shows a valve position for the desorption phase switching position Des. The circuit includes an adsorption heat or refrigeration system AWP formed of an adsorber/desorber unit A/D and an evaporator/condenser unit V/D. The adsorber/desorber unit A/D serves, at the same time, in the adsorption and the desorption of the refrigerant, while the evaporator/condenser unit V/K is used for both the evaporation and condensation of the refrigerant depending on the respective operating phase. The refrigerant circuit between the adsorber/desorber unit A/D and the evaporator/condenser unit V/K is not shown herein for reasons of simplifying the illustration.

Moreover, the temporary storage ZS is provided. Three thermal contacts HT, MT and NT serve to adjust defined temperatures. Same are realized in the form of external heat reservoirs which are passed through by conduit sections of the heat recovery circuit. The thermal contact HT represents a high-temperature contact with a high temperature $T_{HT}$, the thermal contact MT a medium-temperature contact with a medium temperature $T_{MT}$, and the thermal contact NT a low-temperature contact with the low temperature $T_{NT}$. That is, $T_{HT} > T_{MT} > T_{NT}$. The heat transfer medium flows through the thermal contacts and thus adopts the corresponding temperatures in a defined manner. The desorption and the adsorption phases of the adsorption heat or refrigeration system are used for these temperature settings.

During the heat recovery phases the heat transfer medium, which has been brought either to temperature $T_{MT}$ or $T_{NT}$, is cyclically replaced in the evaporator/condenser unit V/K, and the heat transfer medium stored in the meantime is displaced into, respectively released from the temporary storage ZS.

The temperature of the heat transfer medium is registered at at least two points during the course of the process. The first temperature monitoring point T1 is positioned at the outlet of the evaporator/condenser unit V/K, the second temperature monitoring point Z2 is arranged at the outlet of the temporary storage ZS.

The heat transfer medium is circulated by two pumps P1 and P2 which are each located at the inlet of the adsorber/desorber unit A/D and at the inlet of the evaporator/condenser unit V/K.

The various cycle-dependent switching positions and flow directions of the heat transfer medium are adjusted by valves V1, V2, V3, V4, V5 and V6. The actual heat recovery circuit is controlled by valves V3 to V6, while valves V1 and V2 set a defined temperature of the heat transfer medium for the adsorber/desorber unit A/D.

All valves in this example are configured as three-way valves. They are switched by a control device not illustrated. The control device and the valves are formed as part of a control circuit. The control circuit comprises a temperature sensor at the temperature monitoring point T1 and a temperature sensor at the temperature monitoring point T2, as well as a unit for calculating a temperature difference between the temperature values measured at these points. Depending on the measured temperature difference the phases explained below are stopped or started. To this end, valves V1 to V6 bring the arrangement successively into the desorption phase switching position, a first heat recovery switching position, an adsorption phase switching position and a second heat recovery switching position.

FIG. 3 shows the desorption phase switching position Des. In the adsorption heat or refrigeration system AWP the desorption phase is run through in the adsorber/desorber unit A/D. To this end, the adsorber/desorber unit A/D is brought into the HT thermal contact. For this purpose the valves V1 and V2 are adjusted such that the heat transfer medium is circulated by pump P1 in a circuit between the HT temperature reservoir and the adsorber/desorber unit A/D. The refrigerant in the adsorption heat or refrigeration system is, at the same time, desorbed and condensed in the evaporator/condenser unit V/K.

During the regular desorption process, or at least at the end thereof, the evaporator/condenser unit V/K is maintained at a medium-temperature level $T_{MT}$. The heat transfer medium is circulated, to this end, by pump P2 through correspondingly adjusted valves V3 and V4 in a circuit between the MT temperature reservoir and the evaporator/condenser unit V/K.

It can be seen in FIG. 3 that both the temporary storage ZS and the low-temperature reservoir NT are separated from the system during the desorption phase.

The desorption phase is followed by a first heat recovery phase. To this end, the valves V1 to V6 realize the first heat recovery switching position WR1 shown in FIG. 4. For this purpose, the valves V1 and V2 remain in the positions shown in FIG. 3. The desorption is thus continued in the adsorber/desorber unit A/D. Valves V3, V4, V5 and V6 establish a circulation between the evaporator/condenser unit V/K and the temporary storage ZS, the circulation being driven by pump P2.

While the desorption process inside the adsorber/desorber unit A/D continues, the evaporator/condenser unit V/K is contacted by the heat transfer medium from the temporary storage ZS. The heat transfer medium has a temperature which corresponds to the temperature $T_{NT}$ of the low-temperature reservoir NT. The consequently cold heat transfer medium displaces the heat transfer medium which has remained at the evaporator/condenser unit V/K from the preceding desorption phase and has a temperature $T_{MT}$, thereby cooling the evaporator/condenser unit V/K down to the temperature $T_{NT}$. The heat transfer medium still remaining at the evaporator/condenser unit V/K and having the temperature $T_{MT}$ is transferred into the temporary storage ZS where it displaces the heat transfer medium having the temperature $T_{NT}$. Thus, a replacement of the hot heat transfer medium by the cold heat transfer medium on the one hand, and of the cold heat transfer medium by the hot heat transfer medium on the other hand, takes place both at the evaporator/condenser unit V/K and in the temporary storage ZS. At that, the heat having the temperature $T_{MT}$ absorbed by the heat transfer medium is stored in the temporary storage.

In connection with this, the cooling of the evaporator/condenser unit V/K to temperature $T_{NT}$ forces the condensation of the refrigerant still taking place there. Thus, the desorption pressure in the adsorber/desorber unit A/D is reduced so that the desorption of the refrigerant taking place there is performed more intensively, and is completed. The desorption pressure reduction allows a particularly effective after-desorption after the conclusion of the actual desorption phase and thus reduces the residual loading of the sorption surface in the adsorber/desorber unit A/D. Thus, the loading width is increased.

The process of the combined heat recovery and desorption pressure reduction is concluded when a substantially identical temperature is measured both at point T1 and point T2 and the temperature difference between the temperatures changes its sign at point T1 and point T2. This is precisely the case when the residual amount of the heat transfer medium remaining in the temporary storage ZS and having the temperature $T_{NT}$ has left the temporary storage ZS and the heat transfer medium starts exiting again at temperature $T_{NT}$ from the evaporator/condenser unit after the heat transfer medium having the temperature $T_{MT}$ had been displaced there. Immediately after that the control unit switches valves V1 to V6 from the first heat recovery switching position WR1 to the adsorption phase switching position Ads.

FIG. 5 shows the adsorption phase switching position Ads. The adsorption of the refrigerant is performed in the adsorber/desorber unit A/D, while the evaporation of the refrigerant takes place in the evaporator/condenser unit V/K. The temporary storage ZS contains the heat transfer medium heated to temperature $T_{MT}$ and is separated from the other components. Valves V1 and V2 are switched to couple the adsorber/desorber unit A/D to the MT thermal contact. The heat transfer medium is driven by pump P1 into the adsorber/desorber unit A/D, through valve V2, through the MT thermal contact, through valve V1, back to the pump.

The evaporation of the refrigerant takes place at a low pressure and a low temperature. The evaporator/condenser unit V/K is coupled to the NT thermal contact. The heat transfer medium is driven by pump P2 into the evaporator/condenser unit V/K, and is passed by correspondingly adjusted valves V4, V5 and V6 to the NT thermal contact, before flowing through valve V3 back to the pump and back into the evaporator/condenser unit V/K.

Figure 6:
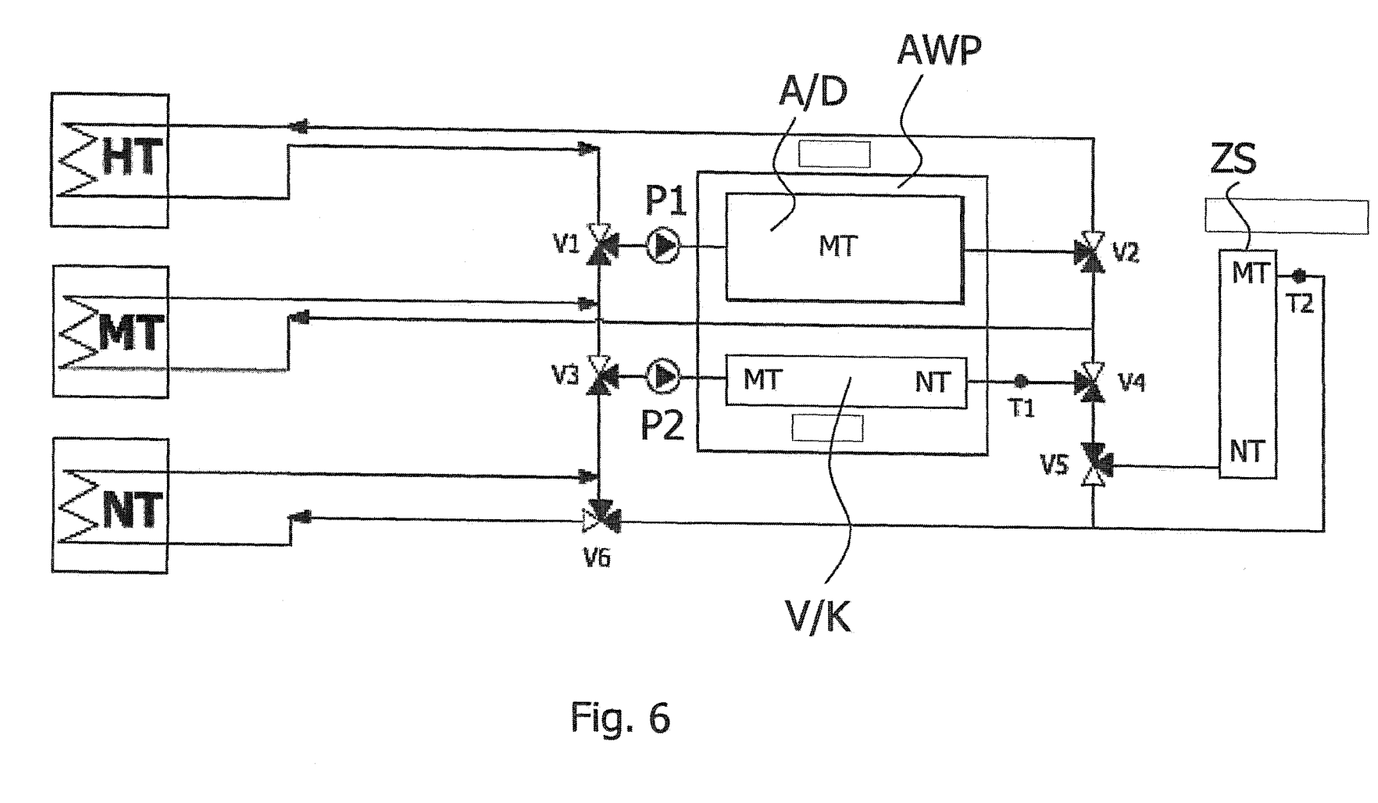
FIG. 6 shows an illustration of the arrangement shown in the previous figures whilst undergoing the adsorption pressure increase and a temporary heat storage combined therewith.
Figure 7:
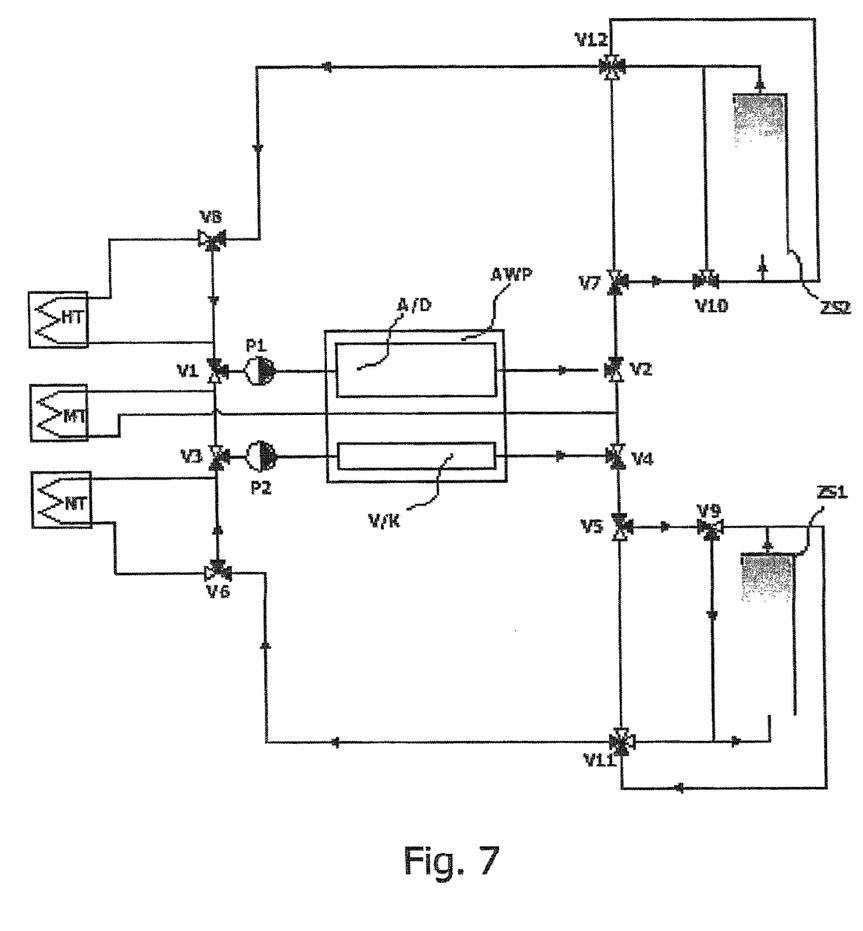
FIG. 7 shows an illustration of the heat recovery after the desorption phase, with two storages and reversal of the flow through the storages.
Figure 8:
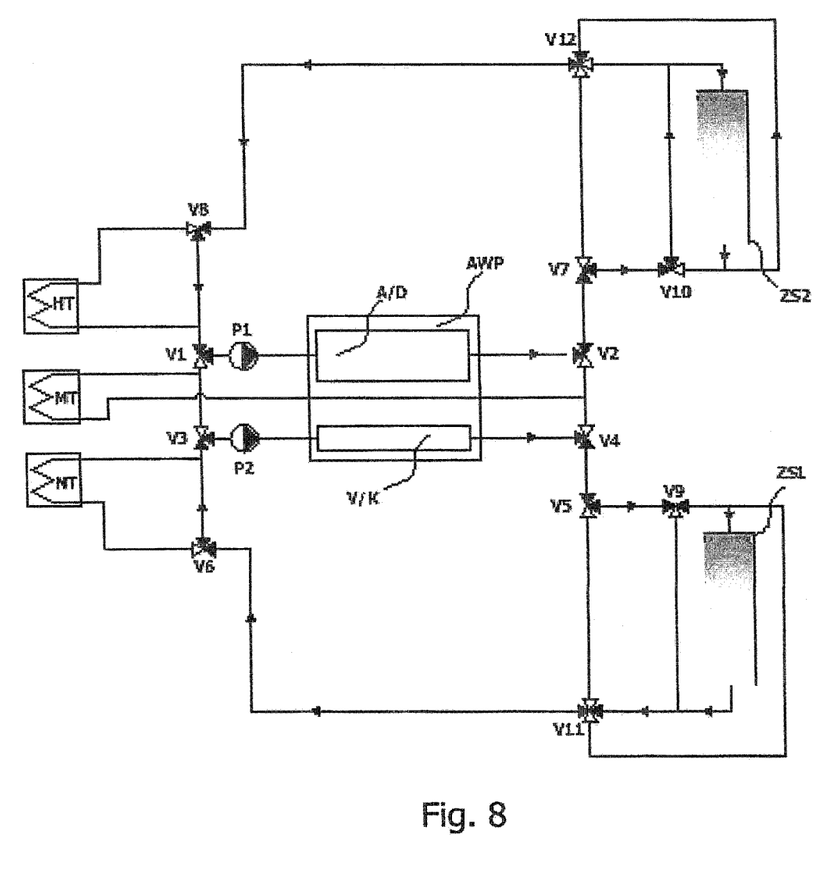
FIG. 8 shows an illustration of the heat recovery after the adsorption phase, with two storages and reversal of the flow through the storages.

The adsorption phase is followed by a second heat recovery phase. To this end, valves V3, V4, V5 and V6 are set into the second heat recovery switching position WR2. The switching position WR2 is shown in FIG. 6.

The second heat recovery switching position serves to return the heat stored in the temporary storage ZS during the first heat recovery phase to the evaporator/condenser unit V/K. In the meantime, the adsorber/desorber unit A/D continues to perform the adsorption of the refrigerant. As can be seen in FIG. 6 the evaporator/condenser unit V/K is separated from the low-temperature contact NK, and a circulation driven by pump P2 with the temporary storage ZS is established. The heat transfer medium having the temperature MT, which is contained in the temporary storage ZS, is now pressed by the pump through valve V6 and valve V3 into the evaporator/condenser unit V/K where it displaces the heat transfer medium present there which has a temperature $T_{NT}$. The displaced heat transfer medium is pushed into the temporary storage ZS where it replaces the remaining heat transfer medium having the temperature $T_{MT}$. By this, the heat stored during the first heat recovery phase is dissipated again to the evaporator/condenser unit V/K. In the meantime, the temperature of the heat transfer medium is registered at points T1 and T2, and the temperature difference between the two values is determined.

During the second heat recovery phase the refrigerant is still adsorbed in the adsorber/desorber unit A/D. The evaporator/condenser unit V/K now raised by the heat transfer medium to the temperature level of the MT thermal contact performs a forced evaporation of the refrigerant. Thus, the refrigerant evaporates into the gaseous phase, resulting in an adsorption pressure increase in the adsorber/desorber unit A/D. The refrigerant is thus adsorbed in a forced manner. As a result, the sorption capacity of the adsorber/desorber unit A/D is thus utilized to a greater extent and the loading width thereof is increased.

The process of the combined heat recovery and desorption pressure increase is concluded when a substantially identical temperature is measured both at point T1 and point T2 and the temperature difference between the temperatures changes its sign at point T1 and point T2. This is precisely the case when the residual amount of the heat transfer medium remaining in the temporary storage ZS and having the temperature $T_{MT}$ has left the temporary storage ZS and the heat transfer medium starts exiting again at temperature $T_{MT}$ from the evaporator/condenser unit after the heat transfer medium having the temperature $T_{NT}$ had been displaced there. Immediately after that the control unit switches valves V1 to V6 from the second heat recovery switching position WR2 to the desorption phase switching position Des according to FIG. 3.

The whole cycle consisting of desorption phase and first temperature setting, first heat recovery and first temporary storage of the heat transfer medium, adsorption phase and second temperature setting and second heat recovery and second temporary storage of the heat transfer medium can now be passed through again.

The basic structure described in the figures may be modified advantageously in particular in respect of the temporary storage: To this end, it is possible to provide one temporary storage for the hot and one for the cold heat transfer medium instead of providing only one temporary storage and, furthermore, to thermally couple these temporary storages to the high-temperature contact HT and the medium-temperature contact MT so as to realize the heat recovery and the influencing of the adsorption and desorption pressure in the range of the temperature difference between the temperatures $T_{HT}$ and $T_{MT}$.

In addition, it will be appreciated by those skilled in the art that the procedures explained in the exemplary embodiments can basically also be realized with adsorption heat or refrigeration systems where either the condenser and the evaporator are provided as physically separated devices and/or where two adsorber/desorber units are provided which are push-pull-operated and whose refrigerant circuits are alternately switched to the condensers and the evaporators. In such a case the heat transfer medium is collected in two temporary storages and alternately displaced from these temporary storages between the condenser and the evaporator.

The method according to the invention and the device according to the invention were explained by means of exemplary embodiments. Other embodiments are possible within the framework of the competent action of those skilled in the art. These embodiments are particularly described in the dependent claims.

LIST OF REFERENCE NUMBERS

Ads adsorption phase switching position
Des desorption phase switching position
WR1 first heat recovery switching position
WR2 second heat recovery switching position
AWP adsorption heat or refrigeration system
A/D adsorber/desorber unit
K condenser
V evaporator
V/K evaporator/condenser unit
HT high-temperature contact
MT medium-temperature contact
LT low-temperature contact
P1 first pump
P2 second pump
T1 first temperature monitoring point
T2 second temperature monitoring point
$T_o$ higher temperature
$T_u$ lower temperature
V1 to
V12 valves
ZS temporary storage

The invention claimed is:

1. Method for operating a cyclically working thermal adsorption heat or refrigeration system including a desorption phase and an adsorption phase, comprising at least one adsorber/desorber unit (A/D), a refrigerant cyclically adsorbed during the adsorption phase and desorbed during the desorption phase, an evaporator/condenser unit (V/K) acting as an evaporator or as a condenser depending on the process phase, comprising a cyclic heat recovery taking place at the same time in a heat recovery circuit having a temporary storage (ZS) and a heat transfer medium, comprising the following method steps:

At the end of the desorption phase:
bringing the heat transfer medium having a low temperature ($T_u$) from the temporary storage (ZS) into a thermal contact with the evaporator/condenser unit (V/K),
displacing the heated ($T_O$) heat transfer medium into the temporary storage (ZS) in a first temporary storage phase,
At the end of the adsorption phase:
bringing the heated heat transfer medium from the temporary storage into a thermal contact with the evaporator/condenser unit (V/K),
displacing cold ($T_u$) heat transfer medium into the temporary storage (ZS) in a second temporary storage phase, wherein
the cyclic heat recovery is coupled to a process for increasing the loading width of the adsorber/desorber unit (A/D) by a thermal reduction of the desorption pressure ($p_{des}$) and/or increase of the adsorption pressure ($p_{ads}$),
characterized in that
the evaporator/condenser unit (V/K) is brought into at least one of a low-temperature contact (NT) below the condensation temperature during the first temporary storage phase so as to influence the desorption pressure (pdes) and a medium-temperature contact (MT) above the evaporation temperature during the second temporary storage phase so as to influence the adsorption pressure (pads), wherein the coupling of the evaporator/condenser unit (V/K) to the low-temperature contact (NT) and the coupling of the evaporator/condenser unit (V/K) to the medium-temperature contact (MT) takes place, in each case, before the start of the first or second temporary storage phase.

2. Method according to claim 1,
characterized in that
a storage of the heated and/or cooled heat transfer medium takes place.

3. Method according to claim 1,
characterized in that
the heat of the adsorber/desorber unit (A/D) is cyclically stored in such a way that the heat transfer medium is temporarily stored on a high-temperature level at the end of the desorption phase and/or on a medium-temperature level at the end of the adsorption phase in a second additional storage and is resupplied in the subsequent cycle.

4. Method according to claim 3,
characterized in that
a high-temperature contact (HT) is used when storing the heat transfer medium on the high-temperature level, wherein the heat transfer medium is recirculated on the temperature level of the high-temperature contact (HT).

5. Method according to claim 1,
characterized in that
the storages are flown through by the heat transfer medium and the through-flow direction can be changed corresponding to the temperature stratification appearing in the storages.

6. Method for operating a cyclically working thermal adsorption heat or refrigeration system including a desorption phase and an adsorption phase, comprising at least one adsorber/desorber unit (A/D), a refrigerant cyclically adsorbed during the adsorption phase and desorbed during the desorption phase, an evaporator/condenser unit (V/K) acting as an evaporator or as a condenser depending on the process phase, comprising a cyclic heat recovery taking place at the same time in a heat recovery circuit having a temporary storage (ZS) and a heat transfer medium, comprising the following method steps:

At the end of the desorption phase:

bringing the heat transfer medium having a low temperature ($T_u$) from the temporary storage (ZS) into a thermal contact with the evaporator/condenser unit (V/K), displacing the heated ($T_0$) heat transfer medium into the temporary storage (ZS) in a first temporary storage phase, At the end of the adsorption phase:

bringing the heated heat transfer medium from the temporary storage into a thermal contact with the evaporator/condenser unit (V/K), displacing cold ($T_u$) heat transfer medium into the temporary storage (ZS) in a second temporary storage phase, wherein the cyclic heat recovery is coupled to a process for increasing the loading width of the adsorber/desorber unit (A/D) by a thermal reduction of the desorption pressure ($p_{des}$) and/or increase of the adsorption pressure ($p_{ads}$), characterized in that the evaporator/condenser unit (V/K) is brought into at least one of a low-temperature contact (NT) below the condensation temperature during the first temporary storage phase so as to influence the desorption pressure (pdes) and a medium-temperature contact (MT) above the evaporation temperature during the second temporary storage phase so as to influence the adsorption pressure (pads), wherein the coupling of the evaporator/condenser unit (V/K) to the low-temperature contact (NT) and the coupling of the evaporator/condenser unit (V/K) to the medium-temperature contact (MT) takes place, in each case, before the start of the first or second temporary storage phase and further characterized in that the cyclic heat recovery and the process for increasing the loading width are realized in a valve-controlled manner, wherein the switching times for the valve control are determined depending on a first process temperature (T1) measured at the outlet of the evaporator/condenser unit (V/K), a second process temperature (T2) measured at the outlet of the temporary storage (ZS) and/or a temperature difference (T1–T2) determined between the first and the second process temperatures.

* * * * *